US010402071B1

(12) United States Patent
Khafizova

(10) Patent No.: US 10,402,071 B1
(45) Date of Patent: *Sep. 3, 2019

(54) SIMULTANEOUS ZOOM IN WINDOWS ON A TOUCH SENSITIVE DEVICE

(71) Applicant: Open Invention Network LLC, Durham, NC (US)

(72) Inventor: Margarita Khafizova, Plano, TX (US)

(73) Assignee: Open Invention Network LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/195,720

(22) Filed: Nov. 19, 2018

Related U.S. Application Data

(63) Continuation of application No. 15/333,483, filed on Oct. 25, 2016, now Pat. No. 10,140,003, which is a continuation of application No. 14/590,823, filed on Jan. 6, 2015, now Pat. No. 9,477,373, which is a continuation of application No. 13/769,335, filed on Feb. 17, 2013, now Pat. No. 8,928,700, which is a continuation of application No. 13/034,860, filed on Feb. 25, 2011, now Pat. No. 9,256,917.

(60) Provisional application No. 61/317,827, filed on Mar. 26, 2010.

(51) Int. Cl.
```
G06T 3/40        (2006.01)
G06F 3/0481      (2013.01)
G06F 3/0484      (2013.01)
G06F 3/0488      (2013.01)
```

(52) U.S. Cl.
CPC ...... *G06F 3/04845* (2013.01); *G06F 3/04817* (2013.01); *G06F 3/04883* (2013.01); *G06F 3/04886* (2013.01); *G06T 3/40* (2013.01); *G06F 2203/04803* (2013.01); *G06F 2203/04806* (2013.01); *G06T 2200/24* (2013.01)

(58) Field of Classification Search
CPC ....... G06F 3/04886; G06F 2203/04806; G06F 3/0488; G06F 2203/04808; G06F 3/0416; G06F 3/04845; G06F 3/0485; G06F 2203/04803; G06F 2203/04805; G06F 3/0236; H04M 2250/22
See application file for complete search history.

(56) References Cited

U.S. PATENT DOCUMENTS

| | | |
|---|---|---|
| 6,226,642 B1 | 5/2001 | Beranek et al. |
| 6,247,010 B1 | 6/2001 | Doi et al. |
| 6,288,702 B1 | 9/2001 | Tachibana et al. |

(Continued)

OTHER PUBLICATIONS

Apple, iPhone User Guide, 2011.
Wikipedia, LH Viewtty KU 990, http://en.wikipedia.org/wiki/LG_Viewty_(KU990), Jul. 27, 2011.

*Primary Examiner* — Haixia Du

(57) ABSTRACT

Certain aspects of the present disclosure relate to a technique for generating simultaneous zoom in windows on a touch sensitive device. A first portion of the user content is zooming into by touching the display screen in a proximity of the first portion using the touch input device while retaining an original zoom size of a first remaining portion of the user content. A second portion of the user content from the first remaining portion is zoomed into by touching the display screen in a proximity of the second portion using the touch input device while retaining a zoomed in first portion and an original zoom size of a second remaining portion of the of the first remaining portion, the original zoom size of the first and the second remaining portions being the same.

18 Claims, 18 Drawing Sheets

(56) References Cited

U.S. PATENT DOCUMENTS

| | | |
|---|---|---|
| 6,742,043 B1 | 5/2004 | Moussa et al. |
| 6,992,661 B2 | 1/2006 | Ikehata |
| 7,489,306 B2 | 2/2009 | Kolmykov-Zotov et al. |
| 7,853,898 B2 | 12/2010 | Clark et al. |
| 2002/0112237 A1 | 8/2002 | Kelts |
| 2010/0050115 A1 | 2/2010 | Kaneko |
| 2010/0122207 A1 | 5/2010 | Kim et al. |
| 2010/0146436 A1 | 6/2010 | Jakobson et al. |
| 2010/0287493 A1 | 11/2010 | Majumder et al. |

FIG. 4A

There are a number of types of touch screen technologies including resistive, surface acoustic wave, capacitive, projected capacitance, infrared, strain gauge, optical imaging, dispersive signal technology, and acoustic pulse recognition. Each technology has its own advantages and disadvantages. In resistive technology, the touch screen panel is composed of several layers, the most important of which are two thin, metallic, electrically conductive layers separated by a narrow gap.

FIG. 4B

There are a number of types of touch screen technologies including resistive, surface acoustic wave, capacitive, projected capacitance, infrared, strain gauge, optical imaging, dispersive signal technology, and acoustic pulse recognition. Each technology has its own advantages and disadvantages. In resistive technology, the touch screen panel is composed of several layers, the most important of which are two thin, metallic, electrically conductive layers separated by a narrow gap.

FIG. 4C

There are a number of types of touch screen technologies including resistive, surface acoustic wave, capacitive, projected capacitance, infrared, strain gauge, optical imaging, dispersive signal technology, and acoustic pulse recognition. Each technology has its own advantages and disadvantages. In resistive technology, the touch screen panel is composed of several layers, the most important of which are two thin, metallic, electrically conductive layers separated by a narrow gap.

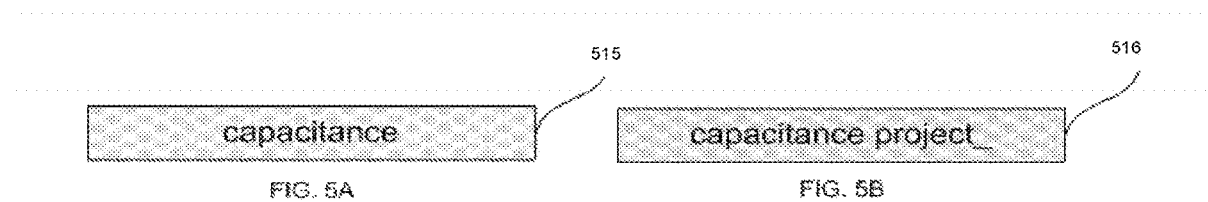

SIMULTANEOUS ZOOM IN WINDOWS ON A TOUCH SENSITIVE DEVICE

FIELD OF THE INVENTION

The present disclosure relates generally to touch sensitive devices and, more specifically, to a method, apparatus and computer-readable medium for generating simultaneous zoom in windows on a touch sensitive device.

BACKGROUND OF THE INVENTION

User interface (UI) is often one of the most important parts of a computer program because it determines how easily a user can communicate with the program. A powerful program with a poorly designed UI has little value. Text-based and graphical user interfaces (GUIs) that use windows, icons, and pop-up menus have become standard on personal computers. Text-based UIs as well as GUIs typically use an input device, such as a keyboard, mouse or stylus, to provide user input and control the movement of a cursor or pointer on a display screen.

Touch-sensitive surfaces are rapidly becoming more common in computing devices. A natural input device for computing devices with touch-sensitive surfaces is a user's finger. They are very convenient as they allow a user to make natural gestures familiar to the user in other contexts, such as by entering handwriting using a special stylus such as an elongated pen-like object having a pointed tip. Many of these devices also allow input to be provided by user's fingertip. The term touch-sensitive surface or device will be used herein to refer to such surfaces or devices that are configured to detect the touch of any type of "stylus" such as a specially-design stylus device or a user's finger. One disadvantage of using a finger or other broad-tipped stylus with a touch-sensitive device is that it is more difficult to accurately target where the finger will and will not touch. For instance, where the touch-sensitive device is combined with a display (thus, a touch-sensitive display), it is difficult to use a finger to target small displayed objects so that they may be selected and/or manipulated. Note that for many elderly and for some people with neurological disorder, it is very difficult to stop their hands from shaking. Clearly, constantly shaking hand will make it very hard for a user to use his finger to navigate through information displayed densely on a touch screen.

In addition, various pointing devices such as mice and man-made pen-type stylus digitizers provide for a hover function, meaning that the user may position the cursor over an area without generating a click. However, few if any touch-sensitive displays have this capability when used by a human finger. The need exists to provide a way for users to hover the cursor using only their finger on a touch-sensitive display, and to provide a way for users to be able to use a touch-sensitive device with their fingers or other inherently imprecise styluses, while maintaining a reasonable level of accuracy.

Solutions including a patent assigned to Microsoft Corporation are attempting to address this problem. One of such patents is a recently issued U.S. Pat. No. 7,489,306 "Touch screen accuracy" by Kolmykov-Zotov, et al. In this invention, a user interface is provided allowing a user to simulate mouse hovering with the user's finger on a touch-sensitive display. When a finger or other stylus touches the touch-sensitive display adjacent to a display cursor, a control appears that enables the user to drag the cursor about the display by dragging the control. Manipulation of the control instead of the cursor allows the user to see the cursor while it moves, making it easier to accurately target small objects that were previously difficult to target directly. See FIG. 1 copied from the above mentioned patent application.

FIG. 1 illustrates an invention described in U.S. Pat. No. 7,489,306 "Touch screen accuracy" by Kolmykov-Zotov, et al. In this embodiment, the cursor handle 192 is a simple circle surrounding the cursor 190. As shown, the contact area 194 is on the cursor handle 192 such that the cursor 190 is ready to be moved. As the user moves his or her finger downward and to the right in FIG. 1, for example, the cursor handle 192 and the cursor 190 simultaneously move with the finger and in the same direction as the finger. At some point during the movement, the finger has now moved to a location indicated by 194a, the cursor 190 has moved to a position indicated by 190a, and the cursor handle 192 has moved to a position indicated by 192a. During the movement, the cursor 190 remains adjacent to the finger (i.e., adjacent to the contact area 194) and the cursor handle 192.

Unfortunately, solution of U.S. Pat. No. 7,489,306 described above is not well suited for small touch screen devices such as cell phones and PDAs with relatively large displayed information. Information that can be easily navigated on large touch screens, need to be reduced in size if the same level of navigation convenience is expected on smaller touch screens. FIG. 2A shows a scaled down version of a city map on a small screen normally seen well on larger screens.

Same information can be easily viewed on larger screen as illustrated in FIG. 2B. Prior art solutions to such problems are re-formatting of information to fit smaller size touch screens, or to zoom into a specific area as needed. The first type of solution is described, for example, in U.S. Pat. No. 6,742,043 "Reformatting with modular proxy server" by Moussa, et al. or in U.S. Pat. No. 6,226,642 "Content modification of internet web pages for a television class display" by Beranek, et al. Authors of both inventions realize that information normally formatted for certain type of screens, needs to be displayed on screens of different sizes and resolution capabilities. Therefore they propose solutions addressing such needs by properly reformatting information content. Any one skilled in the art would recognize immediately that reformatting data is costly as it requires additional hardware and software. Moreover, there is added cost of maintenance as reformatted data could quickly become outdated. E.g., news information may need to be constantly updated, thus reformatting data would be short lived. Moreover, for small devices such as cell phones, PDAs, etc., reformatting most likely would mean reducing the content. Therefore, richness of the content will be lost, and navigating through limited information displayed on the screen may not be very valuable service for the users.

Another obvious and commonly used solution is to zoom into specific area of displayed information. Examples are seen in daily life of anyone using computers zooming into the text of online documentation, or zooming into specific area of a map, etc. For example, you can double-tap or use the pinch gesture to expand webpage columns in Safari. Zoom is a special accessibility feature that lets you magnify the entire screen of any application. For example, iPhone by APPLE Corporation is used to see what's on the display. Turn Zoom on or off: In Settings, choose General>Accessibility>Zoom and tap the Zoom On/Off switch. Zoom in or out: Double-tap the screen with three fingers. By default, the screen is magnified by 200 percent. If you manually change the magnification (by using the tapand-drag gesture, described below), iPhone automatically returns to that magnification when you zoom in by double-tapping with three fingers.

Disadvantage of this method is that while user zooms into a specific area, he is not able to see the "big picture". Consider for example a map application. Often user would like to zoom into a specific area on a city map without expanding the whole map, so that he can keep track of the landmarks and their relative distance and location to the zoomed in area. In general, when detailed information is being looked up, it is desirable to keep the bigger picture in perspective.

U.S. Pat. No. 6,992,661 "Electronic device, digital still camera and display control method" by Ikehata et al, describes an electronic device that comprises a touch screen configured to output coordinate information corresponding to the position where it is touched, a display unit configured to display an item indicating an operating area in a predetermined position on the touch screen, and a control unit configured to clear the item displayed on the display unit when an area of the touch screen other than the area indicated by the item is touched. This invention describes a method of selecting and displaying an enlarged image of a part of the image corresponding to the input image data, does this for images in the context of small sized cameras. Ikehata's invention does not describe consecutive zoom in zoom out operations for localized area (as opposed for the whole information displayed by the application). Method for instructing local zoom in/zoom out operations are different. Ikehata's invention does not describe operations with two or more localized zoom-in areas and objects selected in these areas.

There is therefore a need to provide a way for users to be able to use a touch-sensitive device with their fingers or other inherently imprecise styluses, while maintaining a reasonable level of accuracy.

SUMMARY OF THE INVENTION

Certain aspects of the present disclosure provide a method for viewing user content on a touch sensitive display screen of a touch sensitive device by using a touch input device. The method generally includes zooming into a first portion of the user content by touching the display screen in a proximity of the first portion using the touch input device while retaining an original zoom size of a first remaining portion of the user content and zooming into a second portion of the user content from the first remaining portion by touching the display screen in a proximity of the second portion using the touch input device while retaining a zoomed in first portion and an original zoom size of a second remaining portion of the of the first remaining portion, the original zoom size of the first and the second remaining portions being the same.

Certain aspects of the present disclosure provide an apparatus for viewing user content on a touch sensitive display screen of a touch sensitive device by using a touch input device. The apparatus generally includes at least one processor configured to zoom into a first portion of the user content by touching the display screen in a proximity of the first portion using the touch input device while retaining an original zoom size of a first remaining portion of the user content and zoom into a second portion of the user content from the first remaining portion by touching the display screen in a proximity of the second portion using the touch input device while retaining a zoomed in first portion and an original zoom size of a second remaining portion of the of the first remaining portion, the original zoom size of the first and the second remaining portions being the same; and a memory coupled to the at least one processor.

Certain aspects of the present disclosure provide a computer-program product for viewing user content on a touch sensitive display screen of a touch sensitive device by using a touch input device, the computer-program product generally including a computer-readable medium comprising instructions for zooming into a first portion of the user content by touching the display screen in a proximity of the first portion using the touch input device while retaining an original zoom size of a first remaining portion of the user content and zooming into a second portion of the user content from the first remaining portion by touching the display screen in a proximity of the second portion using the touch input device while retaining a zoomed in first portion and an original zoom size of a second remaining portion of the of the first remaining portion, the original zoom size of the first and the second remaining portions being the same.

BRIEF DESCRIPTION OF THE DRAWINGS

FIGS. 4A, 4B and 4C illustrates Local Zoom Mode of Operation for Text Viewing Application in accordance with an embodiment of the present disclosure.

FIGS. 5A and 5B illustrates Selected Word Search Option, in accordance with an embodiment of the present disclosure.

Figure 1:
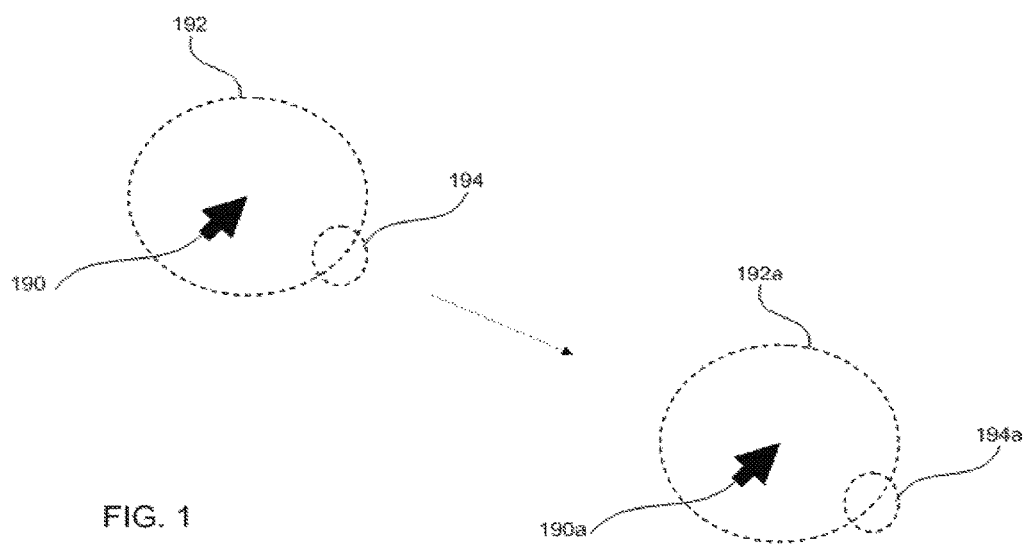
FIG. 1 illustrates an invention described in U.S. Pat. No. 7,489,306 "Touch screen accuracy"

The foregoing summary, as well as the following detailed description of certain embodiments of the present invention, will be better understood when read in conjunction with the appended drawings. The figures illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed imaging software package, and the like. It should be understood that the various embodiments are not limited to the arrangements and instrumentality shown in the drawings.

DETAILED DESCRIPTION

Figure 2A:
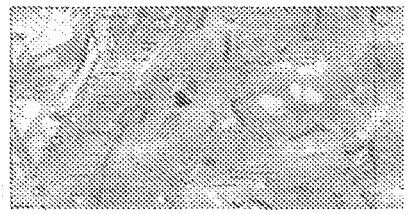
FIG. 2A shows a scaled down version of a city map on a small screen normally seen well on larger screens.
Figure 2B:
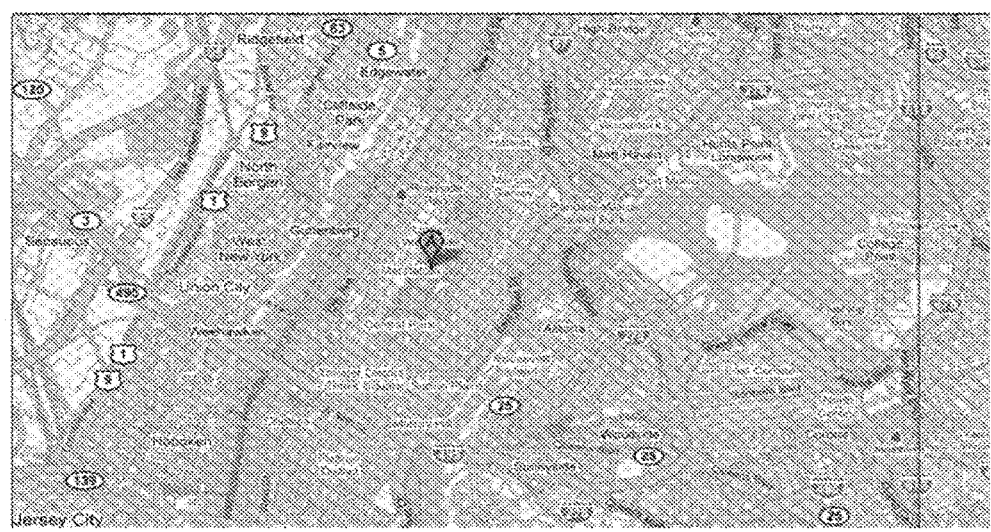
FIG. 2B shows the same map as in FIG. 2A seen on a larger screen.
Figure 2C:
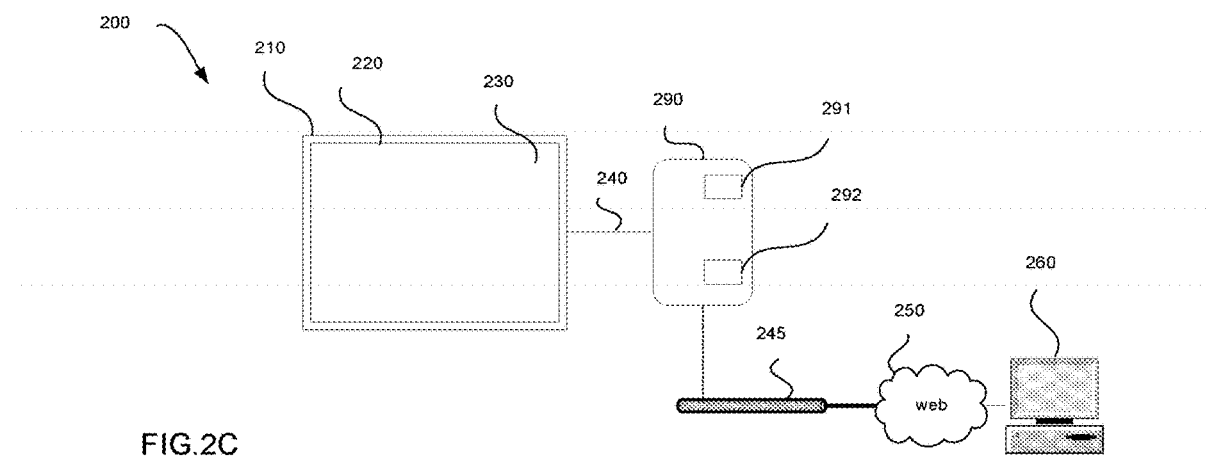
FIG. 2C shows a system with a touch screen capable of detecting touch events in accordance with an embodiment of the present disclosure.

Aspects of the present invention may be used in connection with a system comprising of a touch screen and a computing device. FIG. 2C illustrates a system 200 with a touch screen 220 capable of detecting touch events in accordance with an embodiment of the present disclosure. Specific example in the context of this discussion would be a touch event in a specific location and interpreted by the system as command helping user to improve touch accuracy.

Invented touch sensor system 200 generally comprises one or more touchscreens devices. A touch sensor system with a single touch-screen device 210 is illustrated in FIG. 2C. The touch-screen device 210, communicatively coupled to a controller 290 through link 240, comprises and a transparent touch sensor layer 230 covered by a touch-screen 220 made out of transparent material such as glass. The controller 290 further comprises at least one buffer 291 and at least one specialized microprocessor 292. In present invention the buffer 291 is for temporarily storing auxiliary information such as local zoom button touch counter, X and Y coordinates of the point where touch event was detected, etc. The purpose of the microprocessor 292 is to compute the locally zoomed area, and to re-compute locally zoomed area as user's finger moves on the touch screen surface. It should be noted that the buffer 291 and the microprocessor 292 can be combined with the existing buffer(s) and microprocessor(s) of controllers used in prior art systems.

A touch-screen system comprising the touch-screen device 210 and controller 290 may be used in conjunction with a controller user interface unit 260 coupled with the controller 290 via direct link, internet web 250, wireless, or another connection. It should be noted that often a touch sensor system has only one touchscreen device. It should be also noted that controller 290 and controller interface units may be built in to the touch-screen device 210. Separate units 210, 290, and 260 are shown for illustrating a more general example.

The microprocessor 292 may output the combined information of detected touch events to another device such as a central or host computer 260 via lead 245. It should be understood that the coordinate information passed through the lead 245 is representative only. In addition, information may be output in many forms and formats by the computer 260, such as text or graphics on the display device 210, a different display device or monitor, a light, a bell, an initiation or termination of an action, and the like. Therefore, the information passed through the lead 245 may change based on the purpose of the touch sensor system 200. Optionally, the controller 290 may be located within a monitor or the display device 210, in a separate unit as illustrated, or within the computer 260.

One embodiment of the invention is illustrated using city map application. It should be noted that invention is not limited to city map application. As it will be seen from the description, many other applications where user wishes increased accuracy of his touch commands will benefit as well.

Figure 3:
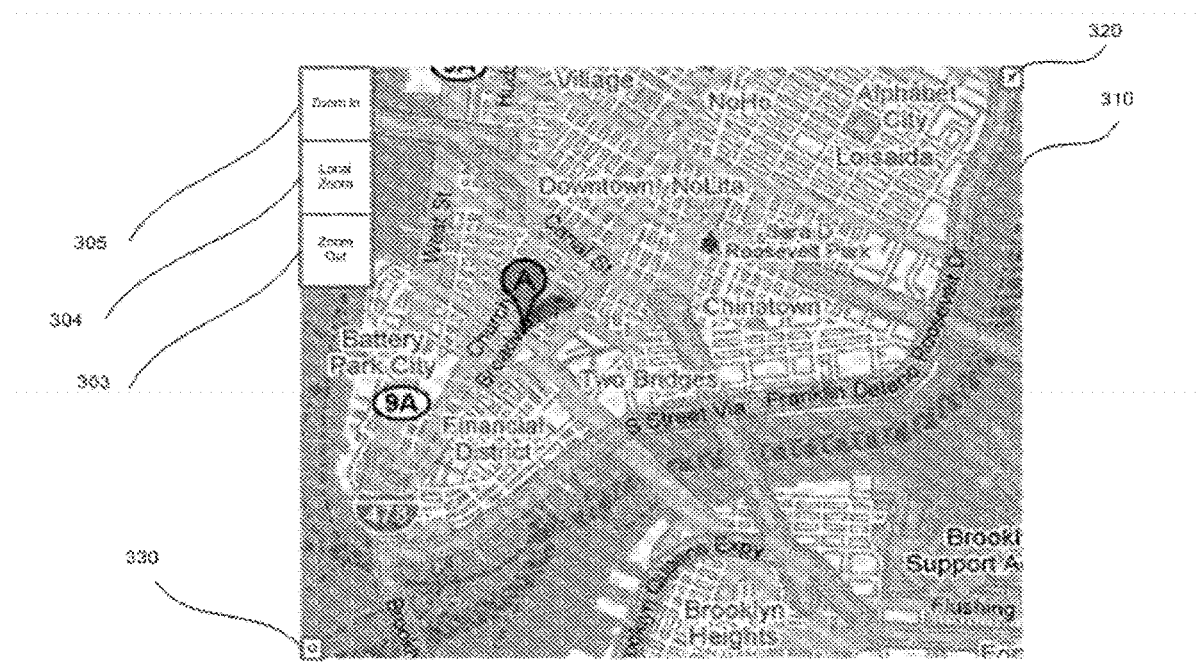
FIG. 3 illustrates a Main Map window in accordance with an embodiment of the present disclosure.

FIG. 3 illustrates a Main Map window in accordance with an embodiment of the present disclosure. In an example illustrated in FIG. 3, the user is viewing a map of lower Manhattan area. We refer to this map as the main map (MM) 310. In FIG. 3, there are three buttons seen in the upper-left corner of the MM. These buttons are "Zoom In" 305, "Local Zoom" 304, and "Zoom Out" 303. In this embodiment we will discuss several map windows. In addition to the MM, there will be one or more smaller maps (SM) enlarging localized area so that the user may easily view and select desired information in specific location without loosing view of the "big picture" provided by the MM. Even though there may be multiple map windows on the screen (as will be discussed below), there is only one set of three buttons 303, 304, and 305.

The user is able to manipulate map windows: create, zoom in/out, move, stretch, etc. Window with which user is performing such operations is referred to as Active Window (AW). Only one window is designated as an active window at a time. (FIG. 3 shows only one map window MM, thus it is also AW by default). When there are more than one map windows on the screen (MM and SMS), any non-active window can be made active by user's touch inside that window. Conversely, if a window is active, any user's touch of another window will make the first window non-active. The active window is highlighted by two small squares. One square 320 is in the upper-right corner. It is marked as "x". Touching this square will result in closing the active window. The other small square 330 is located in the lower-left corner of the AW. It is marked as "0" (or "1" "2", etc. as will be explained later). The user can change the size of the AW by holding and moving this button. The user can zoom in and zoom out map shown in the AW by pressing "Zoom In" and "Zoom Out" buttons 305 and 303, respectively. During Zoom In and Zoom Out operations, the center of the map is fixed. Change center location operations are different for the MM and SM. The user can change the location of the center of the by touching and holding the surface of the map and moving it into the desired direction. For the SM, user can change SM center location by touching its border and moving it to the desired location while holding the touching finger. An SM and said window border are illustrated, for example, in FIG. 3B below.

Figure 3A:
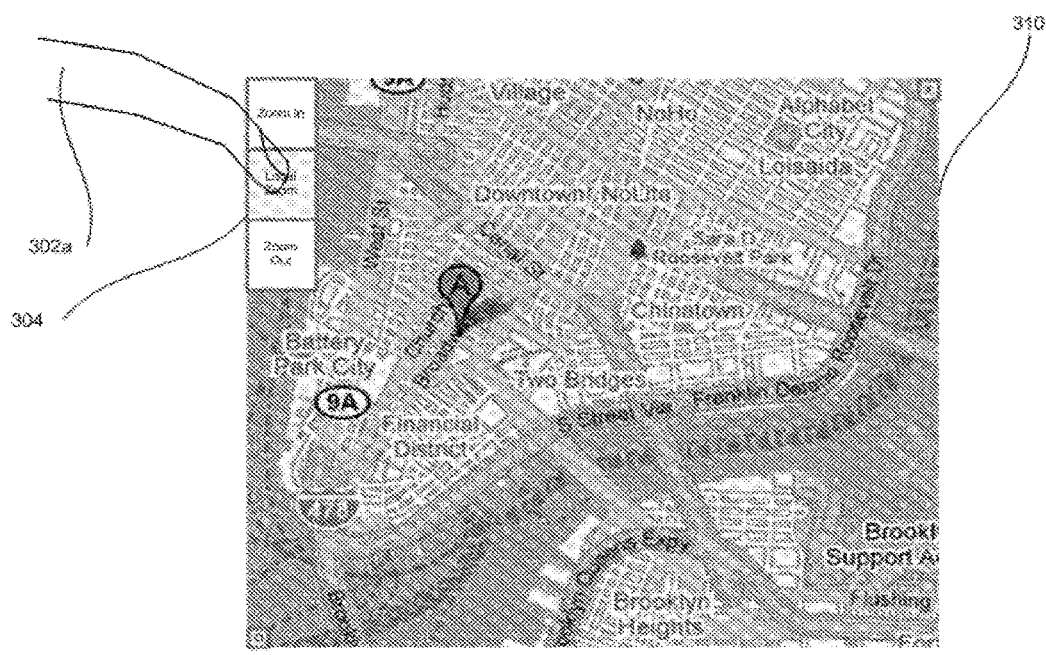
FIG. 3A illustrates a user selecting Local Zoom mode in accordance with an embodiment of the present disclosure.

Assume now that the user wants to see a detailed map of smaller streets near the intersection of Broadway and Canal streets and see the rest of the map visible so that he can easily relate the city landmarks Financial District and Chinatown, as two possible examples. In accordance with one embodiment of this invention the user would touch the "Local Zoom" button 304, to inform the application that he wishes to zoom the AW (in this case MM) locally. This operation is illustrated in FIG. 3A. FIG. 3A illustrates a user selecting Local Zoom mode in accordance with an embodiment of the present disclosure. The user touches button 304 with his finger 302a and the button 304 changes color. Color change indicates that the next expected operation is touching a location inside the AW where local zoom is desired.

Figure 3B:
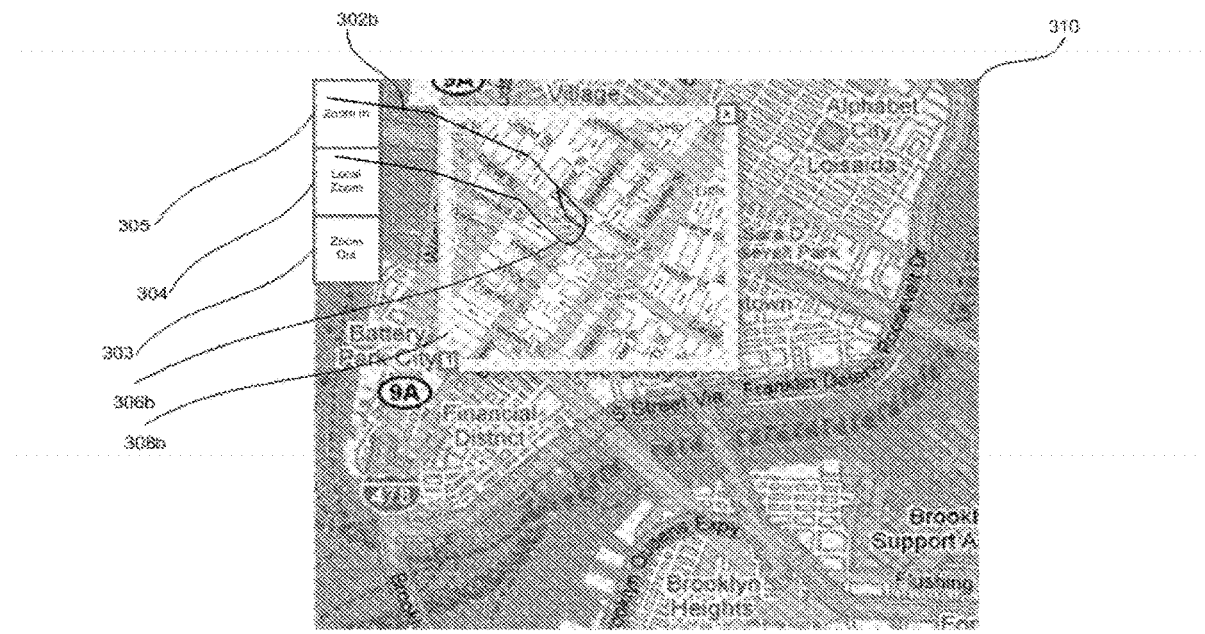
FIG. 3B illustrates the user zooming into a local area in accordance with an embodiment of the present disclosure.

FIG. 3B illustrates the user zooming into a local area in accordance with an embodiment of the present disclosure. Referring to FIG. 3B, we see that by touching the 310 near the point 306b where local zooming is desired the user creates a small map (SM) window 308b. FIG. 3B illustrates local zooming of area around the intersection of Broadway and Canal streets. This operation also makes the SM window 308b the Active Window (AW). Observe that Local Zoom button 304 changes its color to the default white color. That indicates that the AW is NOT in local zoom mode. According to another embodiment, the same result can be obtained by instructing the system via voice command. For example, the user could say "Create a local map inside the main map near the intersection of Broadway and Canal streets".

Figure 3C:
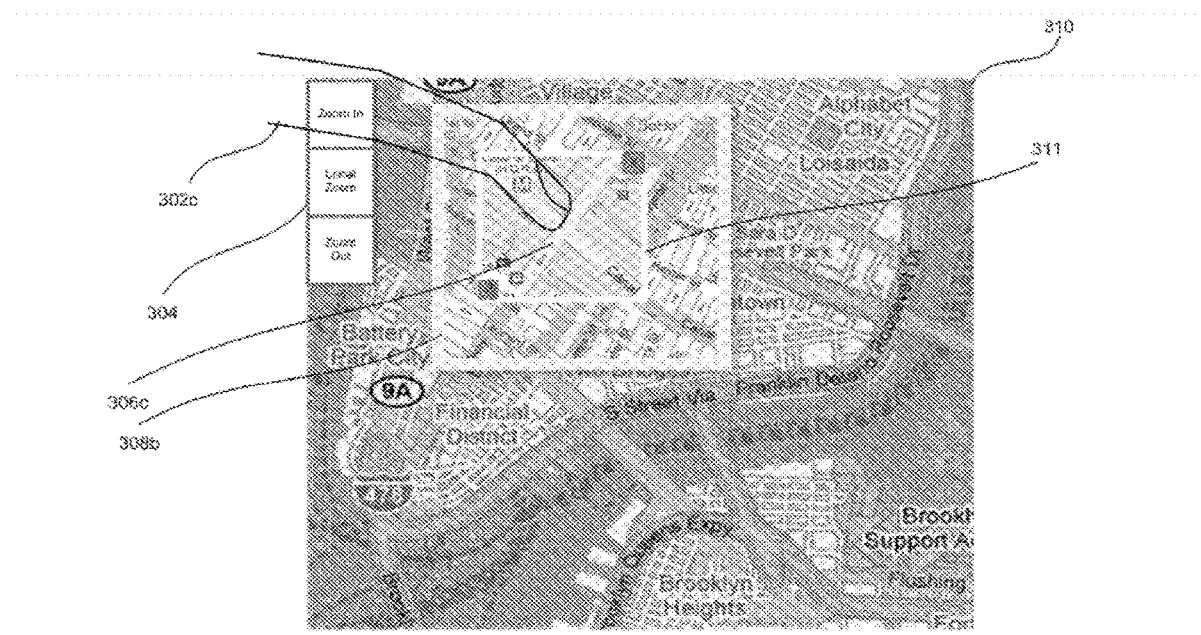
FIG. 3C illustrates the user enabling local zoom inside a small map window in accordance with an embodiment of the present disclosure.

According to one embodiment of the invention, the user may enable local zoom for the small active window 308b by touching Local Zoom button 304 and then touching a point inside the map 308b where the local zoom should be enabled. This scenario is illustrated in FIG. 3C. FIG. 3C illustrates the user enabling local zoom inside a small map window in accordance with an embodiment of the present disclosure. Notice that in FIG. 3C, "Local Zoom" button is not colored, that is because the figure depicts a moment after the user enabled local zoom mode of map 308b (at that moment the button 304 became colored) and then touched near point 306c inside map 308b thus instructing the application to show a new small map 311 inside map 308b. Window 311 is now the active window.

As can be seen from the description of present embodiment, map windows of the application have nested structure. For example, SM 311 is inside SM 308b, which is inside the main map window 310. Thus the map windows have tree structure, and each window map can be assigned a level in that tree. For example, the main map 310 has level 0, the SM map 308b has level 1, SM map 311 has level 2, etc. According to one embodiment of the invention the level of the active window in the tree can be specified by displaying the level number in the colored square located in the lower-left corner of the AW. Alternatively the active window level can be highlighted by the intensity of color of squares in the upper-right and lower-left corners of the active map window. For example for the levels 0, 1, 2, and 3, the selected color scheme could be white, yellow, orange, red, respectively. The maximum number of window levels (e.g., three) and coloring map mentioned in this embodiment are provided for illustration purposes only. Any other combination of window levels and coloring options is possible.

Figure 3D:
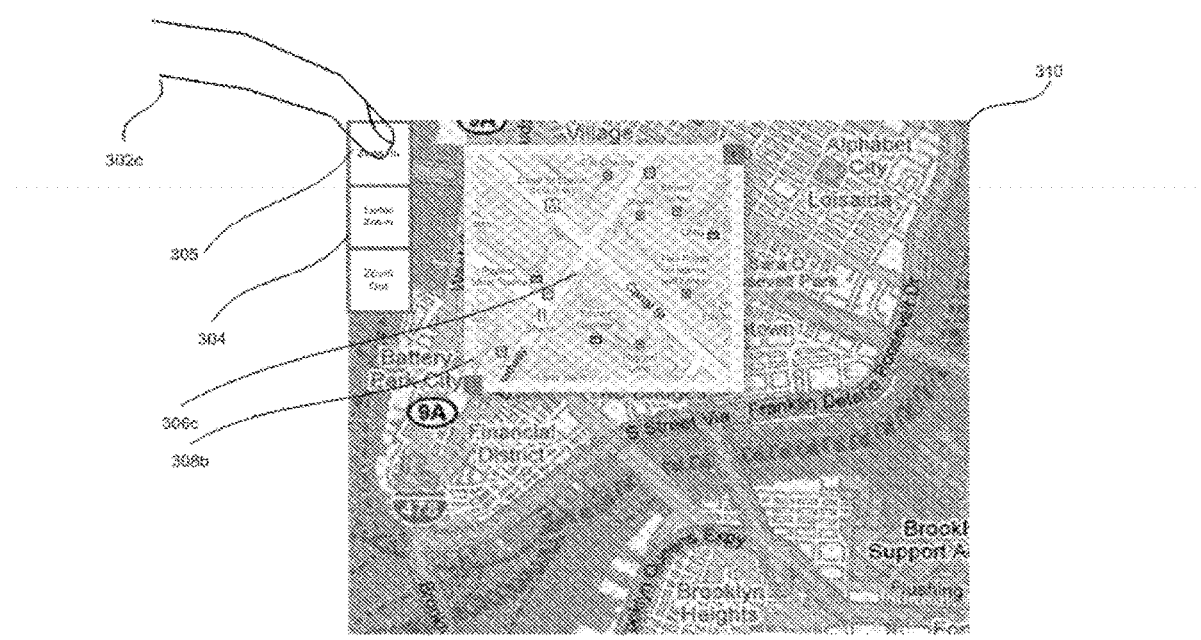
FIG. 3D illustrates user zooming into a local area map in accordance with an embodiment of the present disclosure.

Let's now refer back to FIG. 3B, where the only small window 308b is the active window of the application. According to another embodiment of the invention, the user can zoom inside that map 308b simply by pressing "Zoom In" button 305, and zoom out by touching "Zoom Out" button 303. FIG. 3D illustrates this operation. FIG. 3D illustrates user zooming into a local area map in accordance with an embodiment of the present disclosure. Referring to FIG. 3D, notice that user finger 302c touches "Zoom In" button 305 thus instructing the application to zoom inside the local active map 308b.

The user can also move the SM 308b by touching the border of SM 308b by his finger 302b and moving his finger by holding it down. As user finger moves, the content inside the SM 308b will change to reflect zoomed in area of new location.

Figure 3E:
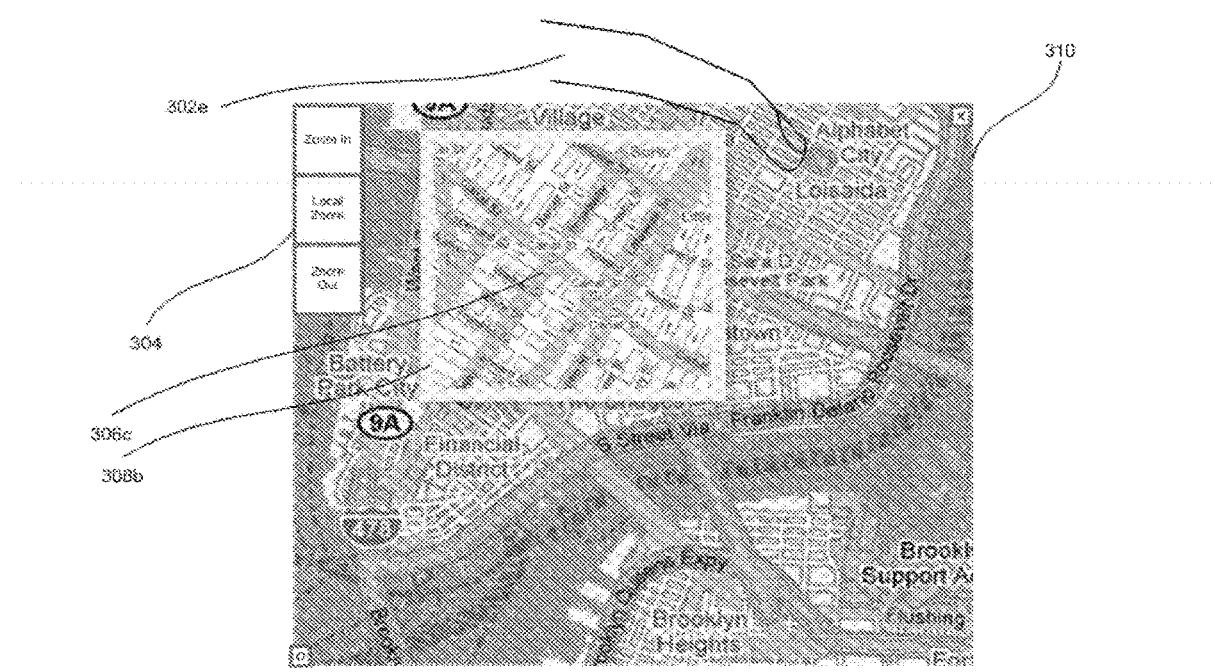
FIG. 3E illustrates the user enabling the main map window as the active window while keeping a local area map window open in accordance with an embodiment of the present disclosure.

Referring again to FIG. 3B, we recall that the SM 308b is the AW. Now suppose the user wants to go back to the MM 310 while leaving SM 308b open. This can be easily done as was mentioned before and as illustrated in FIG. 3E by user finger 302e touching any point inside the MM 310. Such touch command informs the application that now 310 window is the Active Window. If the user wants to close the SM 308b, he would have to make it active by touching any point inside the SM 308b, and then touch the colored "x" square in the upper-left corner of the active window SM 308b. (The last operation is not illustrated in any of the figures presented in this disclosure as by now that operation should be obvious to the reader who followed explanation of all previously described operations.)

Figure 3F:
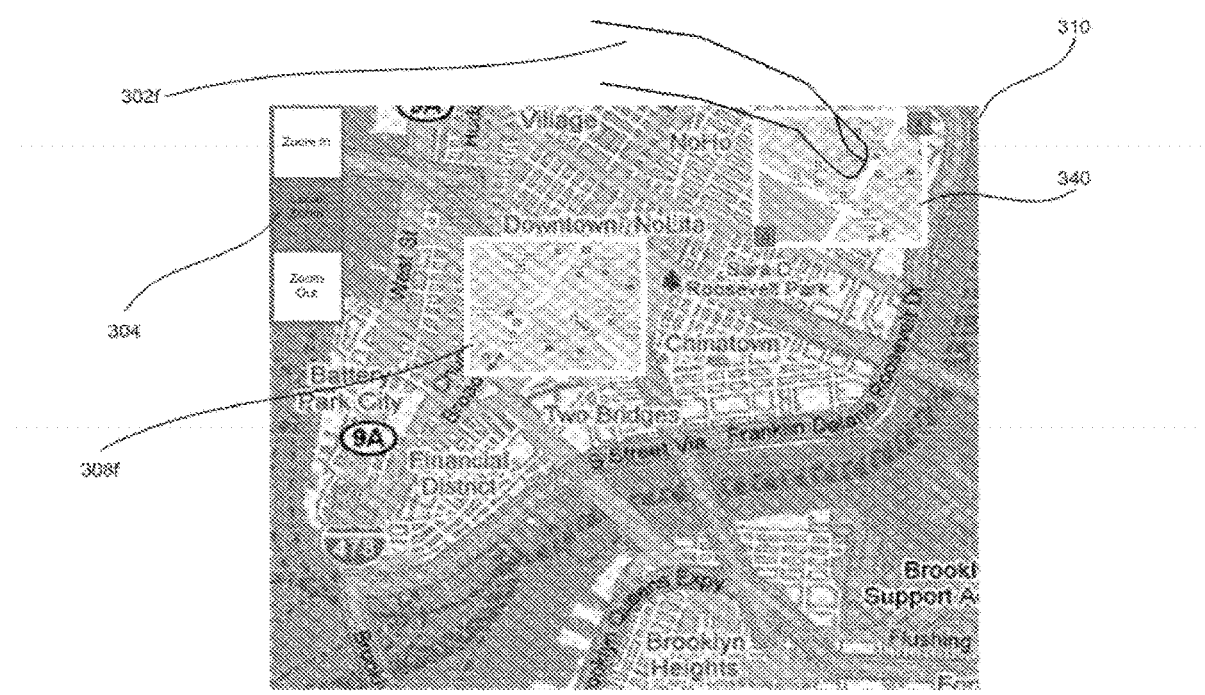
FIG. 3F illustrates the user enabling multiple local zoom maps in accordance with an embodiment of the present disclosure.
Figure 7:
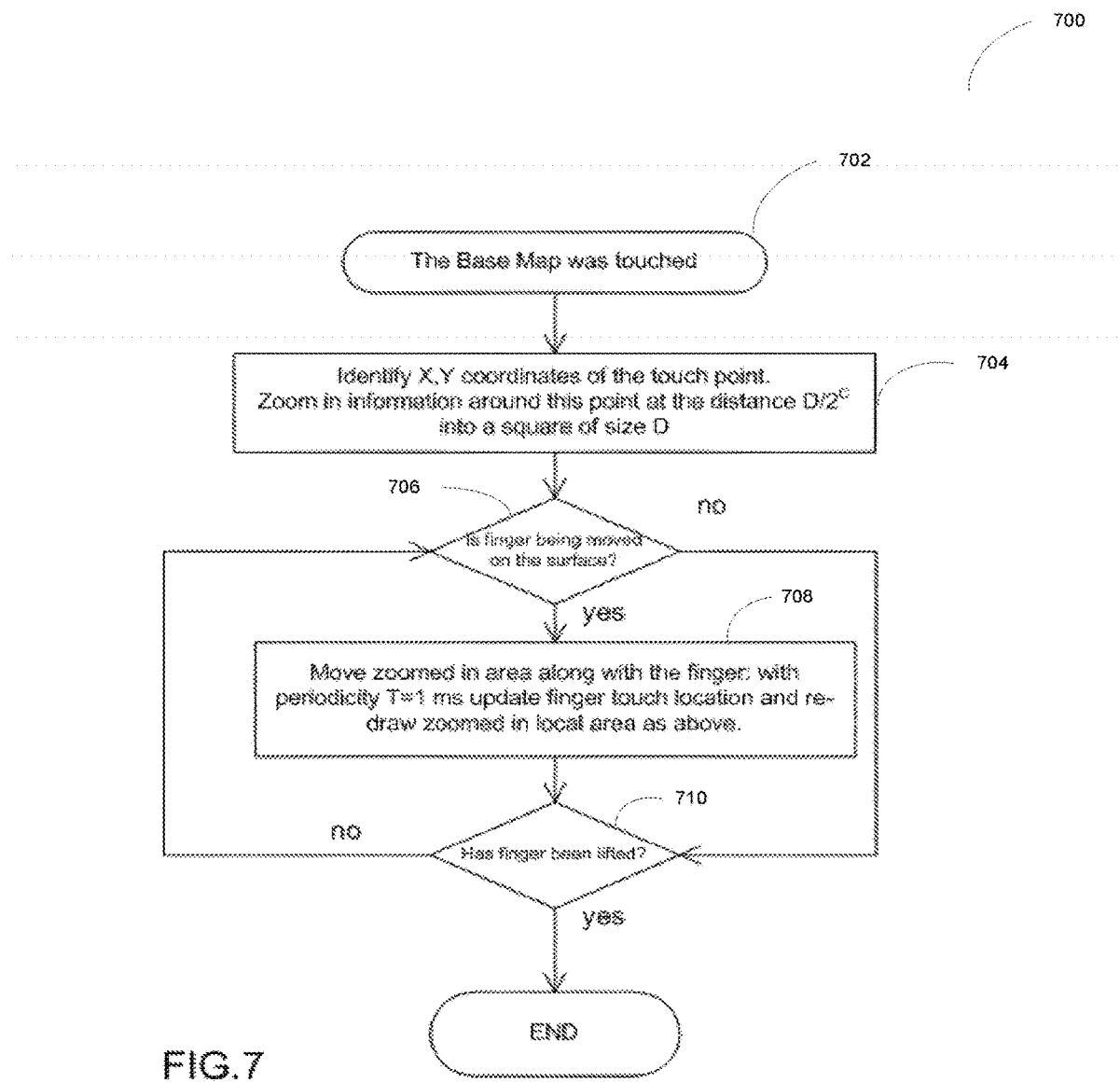
FIG. 7 is an example of a flow diagram illustrating a process of enabling Local Zoom (Small Map) around the touched point of a base map in accordance with an embodiment of the present disclosure.

The user may want to open more than one local area maps inside the MM 310. This can be done in at least one of the following ways. In one embodiment, the user will repeat the sequence of the following touch command: touch "Local Zoom', button 304; then touch a point inside MM 310 where local zoom in window is desired. If three SM widows are required, the user will repeat the above mentioned sequence of touch commands three times. In another embodiment the system will keep a counter C tracking the number of consecutive touches of "Local Zoom" button 304. The user will touch "Local Zoom" button 304 N times if N small map windows are desired by the user. With the first touch "Local Zoom" button will change its color, with each consecutive touch of "Local Zoom" button, the internal touch counter C will be incremented, and the value (C−1) will be displayed inside Local Zoom button 304 whenever C>1. Then the user will proceed by touching MM in desired locations. Each touch will generate a new SM window (which become the AW by default) and will decrement the counter C. As long as C>1, the value of (C−1) will be visible inside the "Local Zoom" button 304. FIG. 3F illustrates this embodiment. Assume the user wanted to have four SM windows inside 310. Thus the user touched "Local Zoom" button 304 four times. Now C=4, and "Local Zoom" button 304 message reads "Local Zoom 3", indicating that four SM will be generated. Referring to FIG. 3F, observe that after user finger touches twice SM 308f, and SM 340 are created. Now C=2, and "Local Zoom" button 304 message reads "Local Zoom 1" indicating that two more SM windows are expected. In another embodiment, the user will instruct the application of each additional local area map creation by a voice command. Example of a flow chart illustrating this operation is shown in FIG. 7 below.

One application (and benefit) of the present invention is finding shortest path between two objects selected by the user on the map. This application will be illustrated in the case when user find two objects in the two different local maps (SMS) as shown in FIG. 3F. FIG. 3F illustrates the user enabling multiple local zoom maps in accordance with an embodiment of the present disclosure. The user will simultaneously touch two selected objects in local zoomed maps 308f and 340 using two fingers. For example, the user can zoom in one area of the map where he stays and select his hotel, in another zoomed in local map the user can select a different building that he wants to visit (or a restaurant he want to go to). By quickly moving his fingers located on two selected objects in two local maps, the user will instruct the system to show on the map the shortest drive way from one place to another. Alternatively, user can instruct the system to show shorted path by voice command "SHOW ME THE SHORTEST PATH", or the quickest path saying "SHOW ME THE QUICKEST ROUTE", or "SHOW THE QUICKEST ROUTE WITH MINIMUM TRAFFIC CONGESTION" Observe that the system will recognize automatically which objects user is trying to connect because they are selected by his fingers. The same procedure can be repeated to connect more than two objects in the one path.

In another embodiment, once user can accurately identify an object of interest in the map, he can instruct the system to send alert with the coordinates of the selected object and additional instruction, e.g., that he plans to be at the specified location at certain time, etc. In another embodiment, the user will place his fingers onto easily identifiable objects in two or more localized maps (e.g., Thai food restaurants) and instruct the system to send a message to his friend(s) with a suggestion to meet at any of the specified locations and respond within fifteen minutes with their choice. Once recipients receive the message, identical application on their computing devices will show map of the area with local zoom in maps around the selected objects, so that they can also take advantage of zooming in at one or more locations while seeing the map of the whole area. It can be seen therefore, that the present invention greatly improves location based services.

Figure 9:
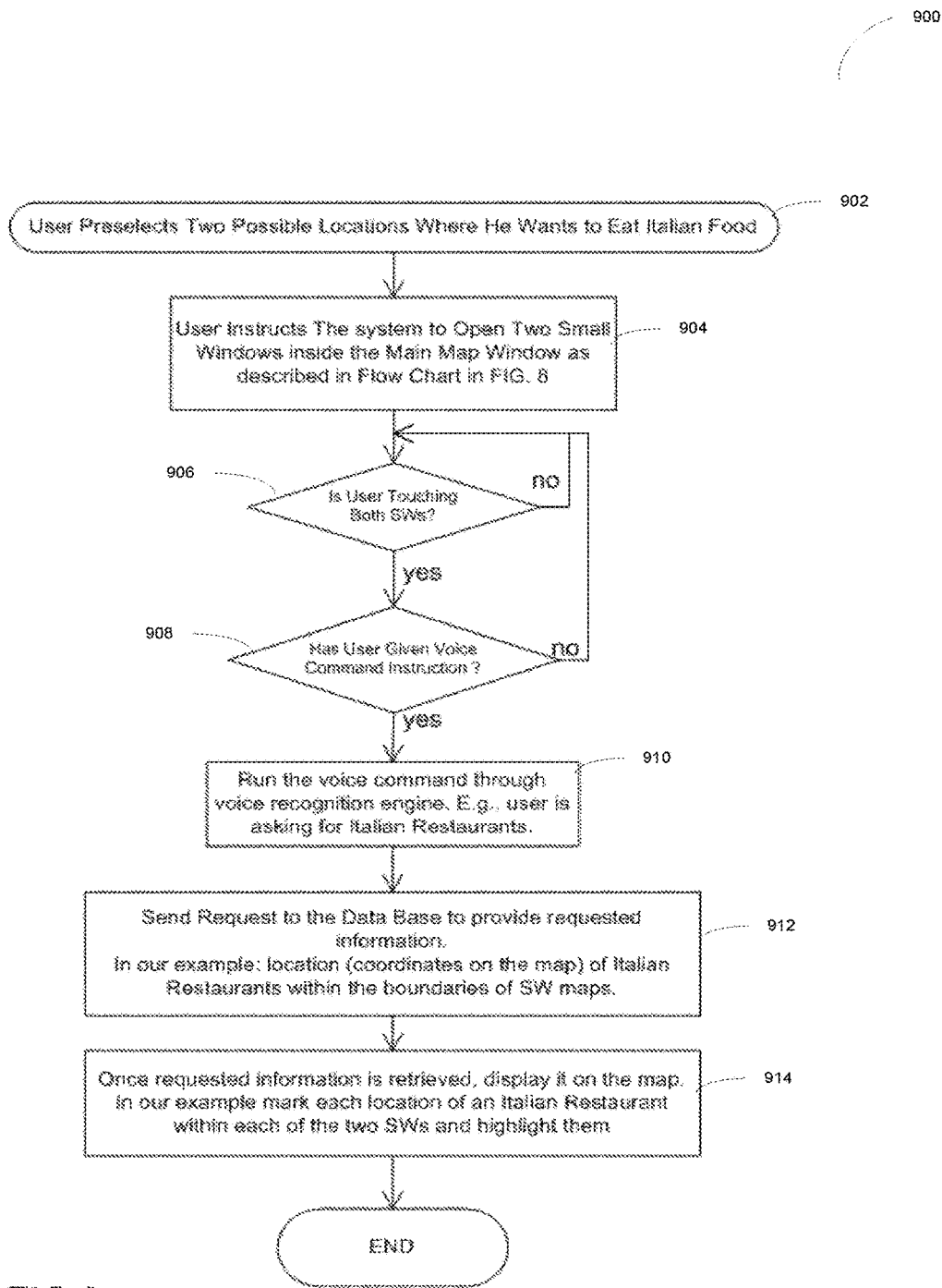
FIG. 9 is an example of a flow diagram illustrating a process of retrieving information from two separate locations in accordance with an embodiment of the present disclosure.

In another embodiment, the user can select for example two local area maps, touch each local area map with his figure and instruct the system by voice "SHOW ME ITALIAN RESTAURANTS". The system will mark and highlight location of Italian Restaurants near each of the specified locations within the boundaries of the corresponding local maps. The user can further instruct the system to get details of all or some of the restaurants he selects by touching them by saying for example "WRITE DOWN WORKING HOURS OF EACH SELECTED RESTAURANTS" or "OPEN HOIUE WEB PAGE FOR EACH OF THE SELECTED RESTAURANTS IN A SEPARATE BROWSER WINDOW" Example of a flow chart illustrating this operation is shown in FIG. 9 below.

In another embodiment of the invention, user can locally enlarge text that he is viewing. Assume user is reviewing text, and decides to do quick update to the text, or wants to select a word or phrase for looking it up in the dictionary. Instead of zooming in the entire text, it is useful to provide user with the capability to zoom into a local text (a few lines or a sentence) so that he can more accurately execute desired touch commands.

According to this embodiment the same procedures as in previous embodiment are used for selecting local zoom mode of operation, selecting local area for zooming and for moving locally zoomed area. FIGS. 4A, 4B, and 4C illustrates Local Zoom Mode of Operation for Text Viewing Application in accordance with an embodiment of the present disclosure. For example if user reading text 420 shown in FIG. 4A decides to zoom into a phrase of a few lines, he will instruct the system to switch to local zoom mode (see FIG. 4B and move his finger 445 until desired text is selected for local zooming (see FIG. 40). In accordance with this embodiment system switching to local zoom in mode is done in ways similar to the ones described earlier for the map application. Specifically, user can press on special "Local Zoom" button similar to button 304 in FIG. 3B, but not shown in FIG. 4A, FIG. 4B, or FIG. 4C, Once system is in the local zoom mode, the user will point an area in the text that needs to be locally zoomed in. In accordance with another embodiment the user will select area in the text by placing his finger, and then while his finger is in the text, he will press "local zoom" button, thus instructing the system to locally enlarge text around the point in the text selected by the user. Alternatively command for switching the system in local zoom mode, or local zoom in and local zoom out instructions can be given by voice commands. E.g., user can say "SWITCH TO LOCAL ZOOM MODE" and then specify area that needs to be locally zoomed in. Or the user can place his finger on the text and say "ZOOM IN" if he wants to zoom in text around the selected point, etc.

Now assuming that the user wants to lookup one of the words or phrases in the selected text in the dictionary, or do web search for that word or phrase, or wants simply go to web sites associated with the word by the application. By double tapping into selected word, user tells the application take this word and place it into the window of the auxiliary application. FIGS. 5A and 5B illustrates Selected Word Search Option, in accordance with an embodiment of the present disclosure. For example, FIG. 5A, illustrates user selecting word "capacitance" 515. Once the word is placed in the window of auxiliary application the user can type additional words 516, as shown in FIG. 5B.

Figures 6A, 6B:
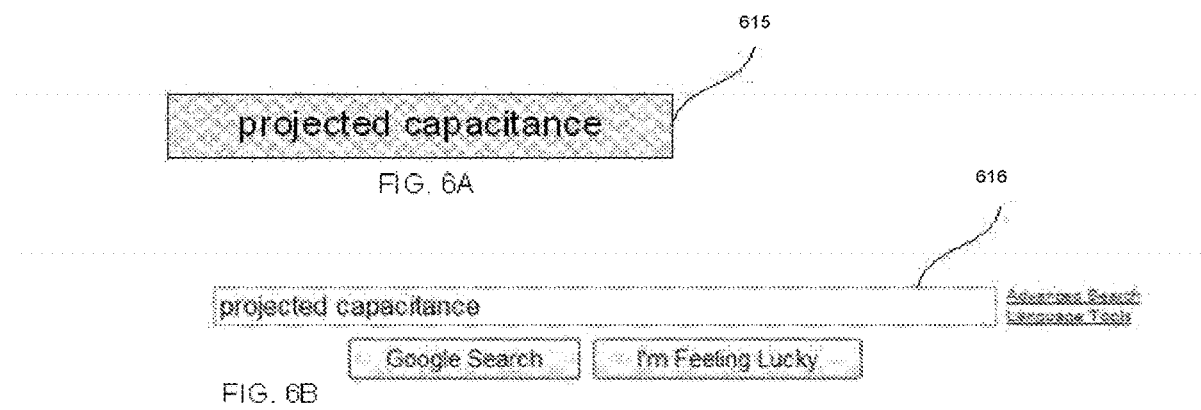
FIGS. 6A and 6B illustrates Selected Phrase Search Option in accordance with an embodiment of the present disclosure.

Alternatively, double tapping on a word would select a phrase between commas in the selected text. FIGS. 6A and 6B illustrates Selected Phrase Search Option in accordance with an embodiment of the present disclosure. For example, FIG. 6A illustrates this by showing that double tapping on word "capacitance" results in selecting the whole corresponding phrase "projected capacitance" 615 between commas of the selected text. As was mentioned above, auxiliary application could be used such as a search engine like Google (see 616 in FIG. 6B), or dictionary, or web pages linked to the word or phrase by the application.

Figure 8:
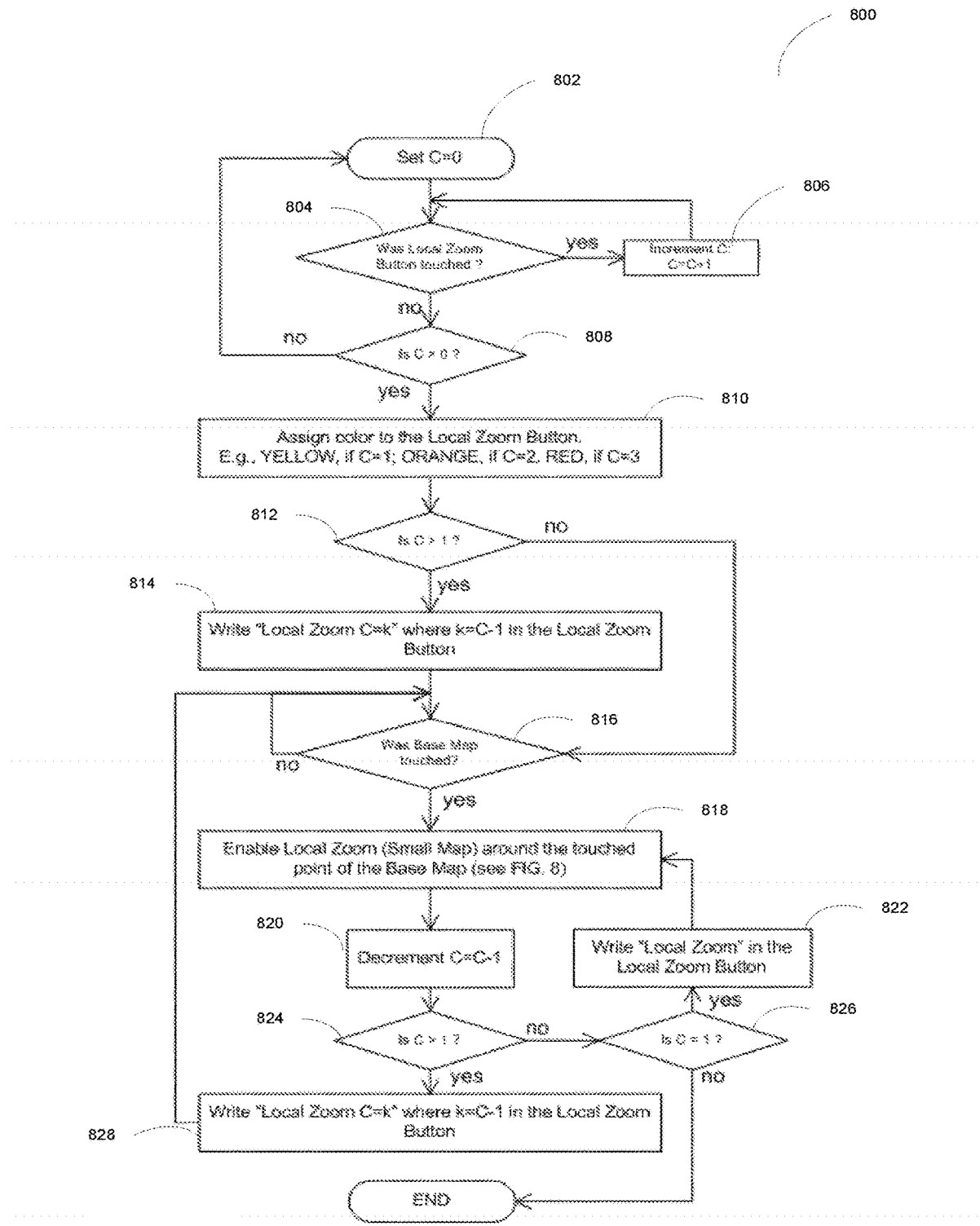
FIG. 8 is an example of a flow diagram illustrating a process of enabling local zoom (small) maps inside a base map in accordance with an embodiment of the present disclosure.

Main operations of the embodiment related to map application of this invention are illustrated in flow charts shown in FIG. 7, FIG. 8, and FIG. 9.

FIG. 7 is an example of a flow diagram illustrating a process 700 of enabling Local Zoom (Small Map) around the touched point of a base map in accordance with an embodiment of the present disclosure. FIG. 7 is the example of the procedure of Enabling Local Zoom (Small Map) around the touched point of the Base Map. Here Base Map refers to the map inside which a smaller map is being drawn, for example, the Main Map with level 0. Accordingly, a Small Map may be a map with level 1. At 702 the base map is touched by a user. At 704, the X and Y coordinates of the touch point are identified and the information around the touch point is zoomed in. At decision block 706, if it is determined that the finger is being moved on the surface, process 700 moves to block 708 where the zoomed in area is moved along with the finger typically with periodicity T=1 ms for updating finger touch location and redrawing zoomed in local area. At 710, if the finger has been lifted, the process 700 ends. If not process 700 moves back to block 706. At 706, if the finger is not moving on the surface, process 700 moves to block 710.

FIG. 8 is an example of a flow diagram illustrating a process 800 of enabling local zoom (small) maps inside a base map in accordance with an embodiment of the present disclosure. Here Base Map refers to the map inside which a smaller map is being drawn. E.g., it could be the Main Map with level 0. Then a Small Map is a map with level 1. At 802, counter C is set to zero. At 804, if the local zoom button is touched C is incremented by 1 at 806. If not, it is checked if C is greater than zero at 808. If yes, a color is assigned to the local zoom button. It is again checked if C is greater than zero at 812. If yes "Local Zoom C=k" is written in the Local Zoom button where k=C−1. If C is not greater than zero at 812 it is checked if base map is touched at 816. If yes, the local zoom is enabled around the touched point of the base map. If not, process 800 keeps checking if base map was touched at 816. At 820 C is decremented by 1. At 824, if C is greater than one, "Local Zoom C=k" is written in the Local Zoom button where k=C−1. If C is not greater than 1 at 824, process 800 checks if C is equal to one at 826. If yes, "Local Zoom" is written in the Local Zoom button. If not, process 700 ends.

FIG. 9 is an example of a flow diagram illustrating a process 900 of retrieving information from two separate locations in accordance with an embodiment of the present disclosure. In this particular example, the retrieved information includes the locations of all Italian restaurants in two selected areas. At 902, a user preselects two possible locations where he wants to eat Italian food. At 904, the user instructs the system to open two small windows (SWs) inside the main map window as described in FIG. 8. At 906, if the user is touching both SWs, process 900 checks if the user has given a voice command instruction at 908. If yes, the voice command is run through voice recognition engine, e.g., user is asking for Italian restaurants. At 912, a request is sent to the database to provide the requested information. For example, location (coordinates on the map) of Italian restaurants within the boundaries of SW maps. At 914, the retrieved requested information is displayed on the map. For example each location of an Italian restaurant is marked within each of the two SWs and highlighted.

Figure 10:
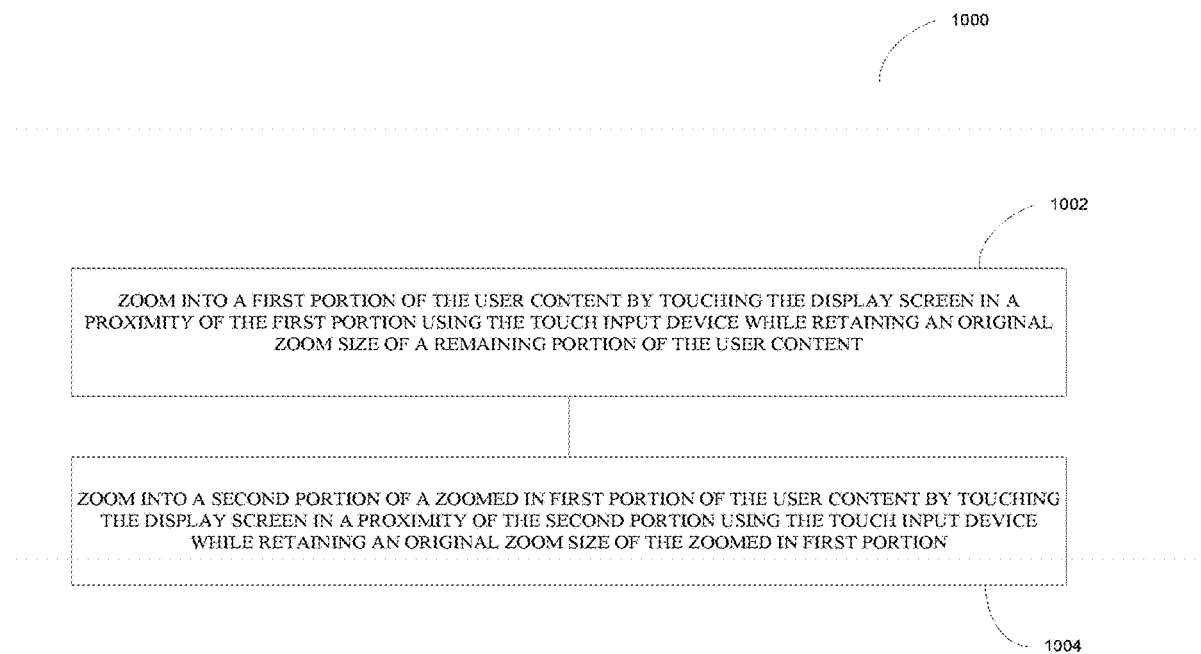
FIG. 10 is an example of a flow diagram illustrating a process of generating simultaneous zoom in windows in accordance with an embodiment of the present disclosure.

FIG. 10 is an example of a flow diagram illustrating a process 1000 of generating simultaneous zoom in windows in accordance with an embodiment of the present disclosure.

Process 1000 begins at 1002 by zooming into a first portion of the user content by touching the display screen in a proximity of the first portion using the touch input device while retaining an original zoom size of a first remaining portion of the user content. At 1004, a second portion of the user content from the first remaining portion is zoomed into by touching the display screen in a proximity of the second portion using the touch input device while retaining a zoomed in first portion and an original zoom size of a second remaining portion of the of the first remaining portion, the original zoom size of the first and the second remaining portions being the same.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic 18 principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

The invention claimed is:

1. A method for viewing user content on a touch sensitive display screen of a touch sensitive device by using a touch input device, the method comprising:
   zooming into a first portion of the user content by touching the display screen in a proximity of the first portion using the touch input device while retaining an original zoom size of a first remaining portion of the user content;
   zooming into a second portion of the user content from the first remaining portion by touching the display screen in a proximity of the second portion using the touch input device while retaining an original zoom size of a second remaining portion of the first remaining portion; and
   displaying a value of an internal touch counter as a window level number, in response to the zooming into each of the first and the second portions.

2. The method of claim 1, wherein the zooming into the first portion comprises:
   displaying the first portion in a first window with a zoom size larger than the original zoom size of the first and second remaining portions.

3. The method of claim 1, wherein the zooming into the second portion comprises:
   displaying the second portion in a second window with a zoom size larger than the original zoom size of the first and second remaining portions.

4. The method of claim 1, wherein the original zoom size of the first and the second remaining portions are the same.

5. The method of claim 1, wherein the display screen comprises the window level number indicating a level of an active window on the display screen.

6. The method of claim 1, wherein a window indicator changes color with each window being added on the display screen.

7. An apparatus for viewing user content on a touch sensitive display screen of a touch sensitive device by using a touch input device, the apparatus comprising:
   at least one processor configured to:
      zoom into a first portion of the user content when the display screen is touched in a proximity of the first portion using the touch input device while an original zoom size of a first remaining portion of the user content is retained;
      zoom into a second portion of the user content from the first remaining portion when the display screen is touched in a proximity of the second portion using the touch input device while an original zoom size of a second remaining portion of the of the first remaining portion is retained;
      display a value of an internal touch counter as a window level number, in response to the zoom into each of the first and the second portions; and
   a memory coupled to the at least one processor.

8. The apparatus of claim 7, wherein the processor is configured to:
   zoom into the first portion by the first portion being displayed in a first window with a zoom size larger than the original zoom size of the first and second remaining portions.

9. The apparatus of claim 7, wherein the processor is configured to:
   zoom into the second portion by the second portion being displayed in a second window with a zoom size larger than the original zoom size of the first and second remaining portions.

10. The apparatus of claim 7, wherein the original zoom size of the first and the second remaining portions are the same.

11. The apparatus of claim 7, wherein the display screen comprises the window level number indicating a level of an active window on the display screen.

12. The apparatus of claim 7, wherein a window indicator changes color with each window being added on the display screen.

13. A computer-program product for viewing user content on a touch sensitive display screen of a touch sensitive device by using a touch input device, the computer-program product comprising:
   a non-transitory computer-readable medium comprising code configured to cause a processor to:
      zoom into a first portion of the user content by touching the display screen in a proximity of the first portion using the touch input device while retaining an original zoom size of a first remaining portion of the user content,
      zoom into a second portion of the user content from the first remaining portion by touching the display screen in a proximity of the second portion using the touch input device while retaining an original zoom size of a second remaining portion of the of the first remaining portion;
      display a value of an internal touch counter as a window level number, in response to the zoom into each of the first and the second portions.

14. The computer-program product of claim 13, wherein the zoom into the first portion comprises displaying the first portion in a first window with a zoom size larger than the original zoom size of the first and second remaining portions.

15. The computer-program product of claim 13, wherein the zoom into the second portion comprises:
   displaying the second portion in a second window with a zoom size larger than the original zoom size of the first and second remaining portions.

16. The computer-program product of claim 13, wherein the original zoom size of the first and the second remaining portions are the same.

17. The computer-program product of claim 13, wherein the display screen comprises the window level number indicating a level of an active window on the display screen.

18. The computer-program product of claim 13, wherein a window indicator changes color with each window being added on the display screen.

* * * * *